United States Patent
Chen et al.

(10) Patent No.: US 10,678,407 B2
(45) Date of Patent: Jun. 9, 2020

(54) CONTROLLING A SYSTEM COMPRISING ONE OR MORE CONTROLLABLE DEVICE

(71) Applicant: SIGNIFY HOLDING B.V., Eindhoven (NL)

(72) Inventors: Bingzhou Chen, Shanghai (CN); Jianping Zhang, Shanghai (CN); Xiang Chen, Shanghai (CN); Hong Ming Zheng, Beijing (CN); Jianlin Xu, Shanghai (CN); Zhen Hua Zhou, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 602 days.

(21) Appl. No.: 14/421,335

(22) PCT Filed: Aug. 6, 2013

(86) PCT No.: PCT/IB2013/056422
§ 371 (c)(1),
(2) Date: Feb. 12, 2015

(87) PCT Pub. No.: WO2014/027275
PCT Pub. Date: Feb. 20, 2014

(65) Prior Publication Data
US 2015/0207849 A1    Jul. 23, 2015

(30) Foreign Application Priority Data
Aug. 16, 2012  (WO) ............... PCT/CN2012/001094

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *H04L 12/2816* (2013.01); *H05B 37/0227* (2013.01); *H04L 2012/285* (2013.01)

(58) Field of Classification Search
CPC .............. G06F 3/0482; G06F 3/04842; G06F 3/04817; H04L 12/281; H05B 33/0845; H05B 33/0863; H05B 37/0227
(Continued)

(56) References Cited

U.S. PATENT DOCUMENTS

| | | | |
|---|---|---|---|
| 2004/0070565 A1* | 4/2004 | Nayar | G06K 9/4661 345/156 |
| 2005/0174473 A1 | 8/2005 | Morgan et al. | |
| 2008/0218087 A1 | 9/2008 | Crouse et al. | |
| 2010/0060726 A1* | 3/2010 | Kryger Nielsen | H05B 37/02 348/65 |

(Continued)

FOREIGN PATENT DOCUMENTS

| | | |
|---|---|---|
| JP | 2010533950 A | 10/2010 |
| JP | 2012514830 A | 6/2012 |

(Continued)

*Primary Examiner* — Phuong H Nguyen
(74) *Attorney, Agent, or Firm* — Meenakshy Chakravorty (57) ABSTRACT

The invention relates to a method and apparatus for controlling one or more controllable devices (5, 6, 7, 38, 39, 40) in a system. In order to provide the apparatus with a more user friendly interface to control the one or more controllable device in the system, the method comprises capturing an image (50), comprising the one or more controllable devices, displaying the captured image (50), associating local areas (105,106,107,108,109,110) in the captured image (50) to the one or more respective controllable devices (5,6,7,38,39,40) on basis of information associated with the controllable devices in the captured image, receiving a user input indicating a selected one of the local areas in the displayed image, determining a command for the one or more controllable devices from the user input associated (Continued)

with the selected local area; and communicating the command to the one or more controllable devices.

13 Claims, 4 Drawing Sheets

(51) Int. Cl.
  *G06F 3/0482* (2013.01)
  *H05B 37/02* (2006.01)
  *H04L 12/28* (2006.01)

(58) Field of Classification Search
  USPC ........................................ 715/736, 740, 810
  See application file for complete search history.

(56) References Cited

U.S. PATENT DOCUMENTS

| 2010/0244746 | A1* | 9/2010 | Van De Sluis | .... H05B 37/0272 |
| | | | | 315/312 |
| 2010/0312366 | A1* | 12/2010 | Madonna | ........... H05B 37/0245 |
| | | | | 700/90 |
| 2011/0199004 | A1 | 8/2011 | Henig et al. | |

FOREIGN PATENT DOCUMENTS

| WO | 2008142603 | A2 | 11/2008 |
| WO | 2010131212 | A1 | 11/2010 |
| WO | 2011085147 | A2 | 7/2011 |
| WO | 2012049656 | A2 | 4/2012 |

* cited by examiner

CONTROLLING A SYSTEM COMPRISING ONE OR MORE CONTROLLABLE DEVICE

CROSS-REFERENCE TO PRIOR APPLICATIONS

This application is the U.S. National Phase application under 35 U.S.C. § 371 of International Application No. PCT/IB2013/056422, filed on Aug. 6, 2013, which claims the benefit of Chinese Patent Application No. PCT/CN2012/001094, filed on Aug. 16, 2012. These applications are hereby incorporated by reference herein.

FIELD OF THE INVENTION

The invention relates to a method and an apparatus for controlling a system comprising at least one or more controllable devices.

BACKGROUND OF THE INVENTION

An example of such an apparatus and method is known from US 2011/019904. This publication discloses commission of a lighting system. A user can be provided with a pointing device capable of emitting or returning a signal which can be received by detectors co-located with each fixture in the lighting system. The user can add a fixture to a group by aiming the pointing device at the fixture when the fixture is not assigned to the group, and the user can remove a fixture from a group in the same way when the fixture was previously assigned to the group. Such method and apparatus can be used to control a system comprising one or more controllable devices, for example, a controllable domestic appliance, a controllable light source, a heating, cooling and ventilation (HCV) system and or other electronic devices.

The known apparatus can be, for example, a remote controller to commission different controllable domestic appliances or controllable light sources in a system. Thereto the user assigns identification codes to the respective domestic appliances and links the buttons of the remote controller with the respective domestic appliances via the identification codes. In order to use one or more of the domestic appliances in the system, a user can load and an application program (App) on his or her smart phone. and link the smart phone via an internet connection to the system and execute the application program. The application program may further comprise assigning identification codes to the respective domestic appliances and linking (virtual or displayed) buttons of the smart phone to the domestic applications via the identification codes.

Drawbacks of the known method and apparatus are that the assigned buttons and the linked devices can be confusing to the user. For example, in different rooms different numbers can be assigned to the same domestic appliances, or the domestic appliances can be positioned on different positions in the different rooms.

SUMMARY OF THE INVENTION

It is therefore an object of the invention to provide a method and apparatus for controlling a system comprising one or more controllable devices having an improved user interface.

According to a first aspect of the invention this object is achieved by a method for controlling a system comprising one or more controllable devices, the method comprising: capturing an image comprising the one or more controllable devices; displaying the captured image; associating local areas in the captured image to the one or more respective controllable devices on basis of information associated with the controllable devices in the captured image; receiving a user input indicating a selected one of the local areas in the displayed image; determining a command for the one or more controllable devices from the user input associated with the selected local area; and communicating the command to the controllable device.

In this way an image can be captured showing the controllable devices. Displaying the image enables a user to associate local areas in the displayed image with the controllable devices in a room, using the visual information of the controllable device in the displayed image. The visual information can be, for example, a shape, light distribution and/or a color and/or a brightness level of the controllable device in the captured image. By receiving the user input indicating the selected local area in the displayed image a command can then be determined for one of the controllable devices and the command can be communicated to the selected controllable device. The controllable device can comprise a controllable light source, a controllable domestic appliance, for example, a heating or cooling device, a TV-set, a multimedia player, etc. The controllable light source comprises a regular light source and a control system to make the light source controllable.

An embodiment of the method comprises associating areas of an input device with the local areas in the displayed image; and generating the user input comprising data corresponding to the indicated area of the input device associated with the selected one of the local areas. In this way local areas of the input device are directly linked to the respective controllable devices visible in the displayed image. An example of the input device is a touch screen device overlaying the displayed image.

A further embodiment of the method comprises receiving identification codes associated to the one or more controllable devices. In this way the method can be used in combination with different environments having different controllable devices. The controllable devices can have their own identification codes stored in the controllable devices.

A further embodiment of the method comprises displaying a number of possible commands related to the selected controllable device, receiving an input indicating the possible commands, and determining the command from the received possible commands. In this way the possible commands of a selected controllable device can be displayed for example on a menu and selected by the user.

A further embodiment of the method comprises assigning the one or more controllable devices to one or more groups using the identification codes, determining a group command from the user input for the one or more groups of the controllable devices; and communicating the group command to the system. In this way a number of controllable devices can be grouped together and can be controlled as a group, wherein each of the controllable devices within the group executes the same command. This can be convenient, for example, to control different groups of controllable light sources in a living room in order to set up a selected lighting scene.

A further embodiment of the method comprises generating the information of the one or more controllable device using respective controllable light sources associated with the respective one or more controllable devices. A user can now easily identify the different controllable devices on basis of the information generated by the light emitted by the respective controllable light sources associated with each of the controllable devices. The information can be a shape or spatial distribution and/or a color and/or a brightness level of light emitted by the controllable light source. A further advantage is that a personal computer or smart phone can automatically perform the identification by using the generated information. The controllable light source may comprise compact fluorescent tubes (Cfli), fluorescent tubes (TL), LEDs, etc.

In a still further embodiment of the method the respective information comprises at least one of a spatial distribution or shape, a color, a brightness of the emitted light of the controllable light source.

In a still further embodiment of the method the information comprises a modulation of at least one of the spatial distribution, the color or the brightness. By providing the controllable light source with predetermined information uniquely linked to the controllable device, for example color, brightness or an intensity modulation, a recognition of the controllable device in the captured image can be further improved. Another example of the information that can be generated comprises coding, for example, QR-code, Barcode and other visible codes. Other type of coding may comprise Amplitude Shift Keying (ASK), Phase Shift Keying (PSK), Frequency Shift Keying (FSK), Quadrature Phase Shift Keying (QPSK), Offset Quadrature Phase Shift Keying (O-QPSK) etc. These kinds of codes are example of codes that can be applied in combination with a single controllable light source.

A further embodiment of the method comprises; changing the information associated with at least one of the one or more controllable devices using the respective controllable light sources, capturing a further image of the one or more controllable light sources; and determining the local areas from a combination of the captured images. Changing the information of the respective controllable light sources can be performed, for example, by switching on and off the controllable light sources one by one. The controllable devices can then be determined easily from a combination of the sequentially captured images and the change of information. The combination of the captured images can be subtracting of the captured images.

A further embodiment of the method comprises assigning graphical symbols to the respective local areas corresponding to the respective one or more controllable devices in a user interface; and displaying the user interface map.

In this way a user interface map can be generated in which the controllable device can be represented by graphical symbols and the interface map can be displayed. The user can then select one of the controllable devices.

According to a second aspect of the invention this object is achieved by providing an apparatus for controlling a system provided with one or more controllable devices, comprising:

a camera device arranged to capture an image of the controllable device;

a display device arranged to show the captured image;

a user input device arranged to receive a user input;

a communication device arranged for communication with the controllable device; and a processor being arranged to control the camera, the display device, the user input device and the communication device, the apparatus being arrange to capture the image of the one or more controllable device; to associate local areas of the captured image with the one or more controllable device on basis of information of the respective one or more controllable device in the captured image; to receive the user input indicating a selected one of the local areas in the displayed image; to determine a command for the controllable device from the user input associated with the selected local area; and to communicate the command to the one or more controllable devices.

In an embodiment, the apparatus comprises a memory device arranged to store identification codes. The processor is arranged to control the memory device as well. In that arrangement the identification codes associated with the controllable device can be stored in the memory. A command to control one of the controllable devices can then be generated using the identification code of the controllable device and the user input.

The invention further relates to a computer program product, which is stored on a computer readable storage media, and which is suitable to perform the method according to claims 1 to 10, when it is run on a digital computer or a digital mobile device.

The invention further relates to a computer program product, which is suitable to perform the method according to claims 1 to 10, when it is run on a digital computer or a digital mobile device. For example, the computer program product can be implemented as an application program (app) for a smart phone.

BRIEF DESCRIPTION OF DRAWING

The above and other, more detailed aspects of the invention will be elucidated and described hereinafter, by way of example, with reference to the accompanying drawing wherein.

DETAILED DESCRIPTION OF EMBODIMENTS

Figure 1:
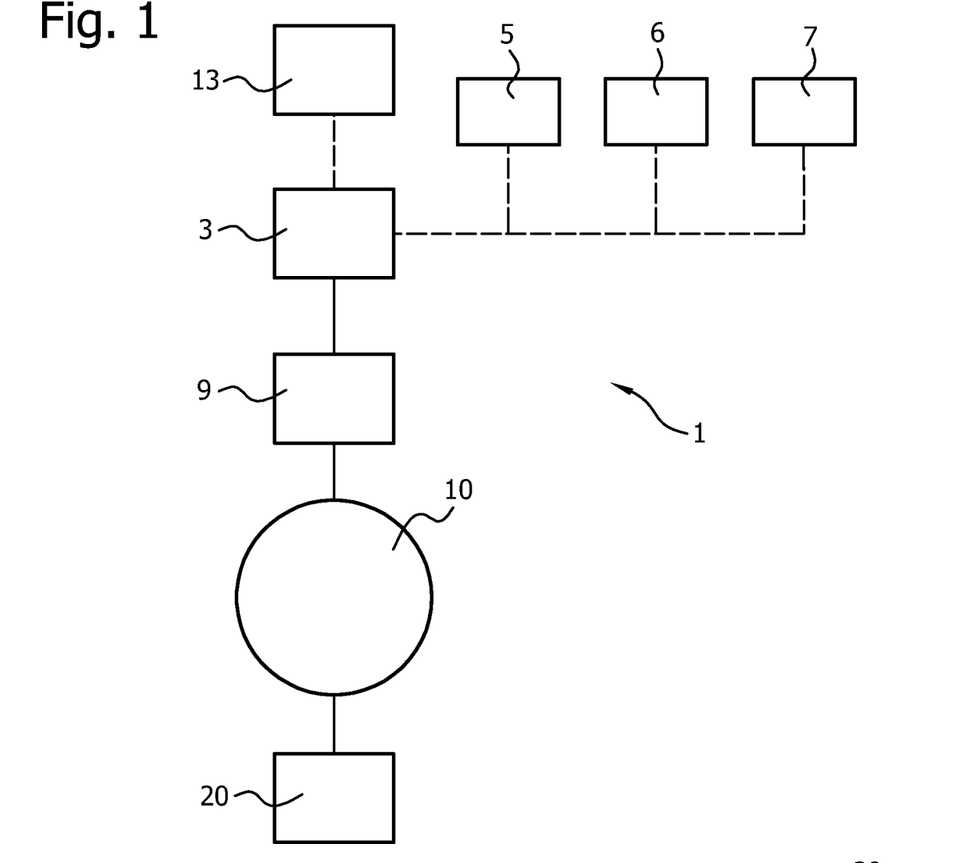
FIG. 1 shows a block diagram of a system comprising controllable devices.

FIG. 1 shows a block diagram illustrating an example of a system 1 comprising one or more controllable devices or appliances. The system 1 comprises a system controller 3 and three controllable devices 5, 6, 7. The controllable device can comprise for example a controllable light source, a home appliance, a heating, cooling or ventilation (HCV) system, a multimedia player etc. The controllable light source comprises a regular light source and a controller to make the light source controllable. The controllable light source can be a single RGBLED or multiple RGBLEDs arranged in an array. The controllable light source may comprise a LED controller for controlling the multiple RGBLEDs, so that a spatial distribution or shape of the emitted light beam can be obtained. The intensity and colour of the RGBLEDs can also be adjusted. The controllable light sources 5, 6, 7 can be wireless controlled via the system controller 3 in a network. Such a controllable light source can be a Living Ambience lamp as offered by Philips. Other controllable light sources may comprise compact fluorescent tubes (Cfli), fluorescent tubes (TL) etc. The system 1 may further comprise a wireless remote control 13 for receiving commands for the controllable light sources 5,6,7. An example of such network can be a Living Ambience Network as offered by Philips. In this way a user can control the colour and/or intensity and/or spatial distribution of the light emitted by the controllable light sources.

The system 1 may further comprise a Wi-Fi router/IP bridge 9. The system controller 3 can be connected via the Wi-Fi router with the Internet 10. The connection can be wireless for example 802.11 n or via an UTP cable. The Wi-Fi router links the Living Ambience network with the Internet. The system controller 3 may also receive commands for controlling the controllable light sources 5, 6, 7 via the Wi-Fi router 9. An apparatus 20 for controlling the system 1 comprising the controllable light sources 5, 6, 7 may comprise a wireless terminal, for example a smart phone, a tablet computer, lap top or PC.

Figure 2:
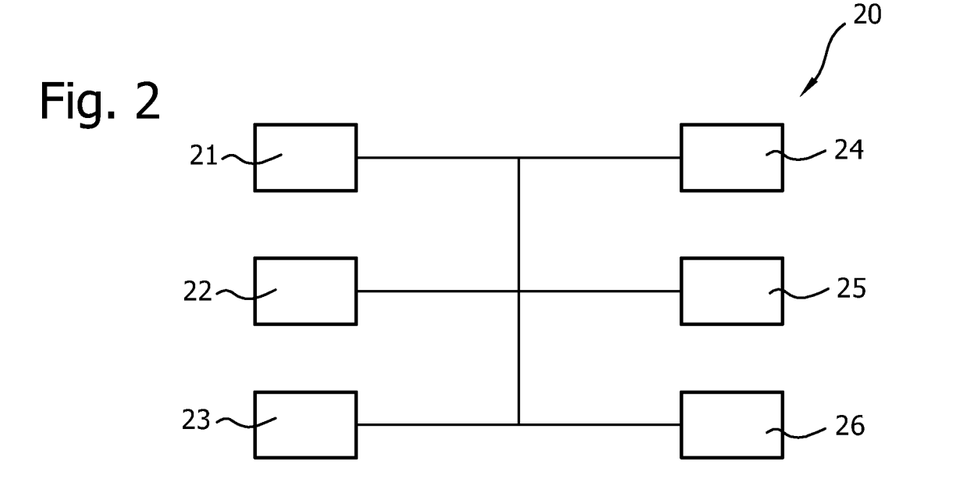
FIG. 2 shows a block diagram of an apparatus.

FIG. 2 shows a block diagram of the apparatus. The apparatus 20 may comprise a camera device 21 arranged to capture an image of one or more Living Ambience Lamps in its environment, for example a living room. The camera device can comprise, for example, a CMOS imaging device. The apparatus further comprises a display device 22. The display device can comprise, for example, a liquid crystal display (LCD), an active-matrix organic light-emitting diode (AMOLED) display etc. Furthermore, the apparatus 20 may comprise a memory device 23 for storage of user data and/or program data. In an example the user data comprises identification codes associated with the controllable light sources. In another example, the data comprises the captured images from the camera device 21. Furthermore, the apparatus 20 comprises a user input device 24. The user input device 24 can be a keyboard or a touch screen arranged to receive a user input. The touch screen 24 can be coupled or overlaid with the display device 22.

Furthermore, the apparatus may comprise a communication device 25. The communication device 25 can be arranged to communicate the system 1 via the Wi-Fi router 9 for example via an 802.11 communication standard or a GSM of G3 protocol, Bluetooth, Zigbee, 6lowPAN etc and the Internet or other network.

Furthermore, the apparatus 20 comprises a processor 26 arranged to control the camera 21, the display device 22, the memory device 23, the user input device 24 and the communication device 25.

Figure 3:
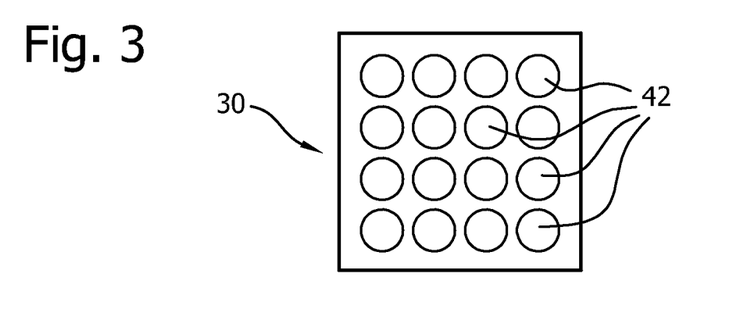
FIG. 3 shows an arrangement of RGBLEDs in a controllable light source.

FIG. 3 shows an example of an arrangement 30 in a controllable light source 41. The controllable light source 41 comprises RGBLEDs 42 arranged in a 4×4 array. Also arrays of 64 RGBLEDs can be used. Multiple controllable light sources 41 can be arranged in a matrix display.

Figure 4:
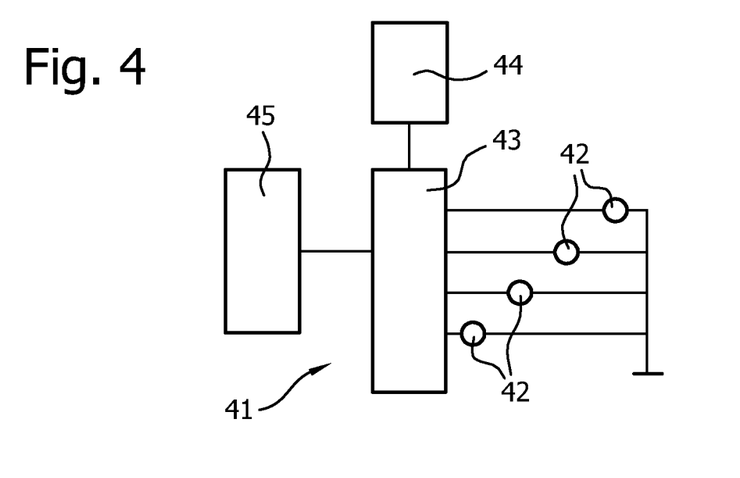
FIG. 4 shows a schematic block diagram of a controllable RGBLED.

FIG. 4 shows a schematic block diagram of the controllable light source 41. The controllable light source 41 comprises a regular light source and a controller, for example a LED driver 43 and 16 RGBLEDs 42, only 4 of them are shown in FIG. 4. The LED driver 43 is connected to the respective LEDs 42 and arranged to drive the RGBLEDs 42. The LED driver 43 can be further arranged to drive the LEDs 42 to a defined colour and brightness according to a defined spatial distribution or intensity modulation by driving one, a few or all the RGBLEDs in the 4×4 arrangement. The controllable light source 41 may further comprise a LED communication device 44 connected to the LED driver 43 for wireless communication with the system controller 3. The controllable light source 41 further comprises a power supply 45 that can be connected to a mains or battery.

The system 1 may comprise, for example, six controllable light sources 5,6,7,38,39,40 arranged in a room, for example a living room.

Figure 5:
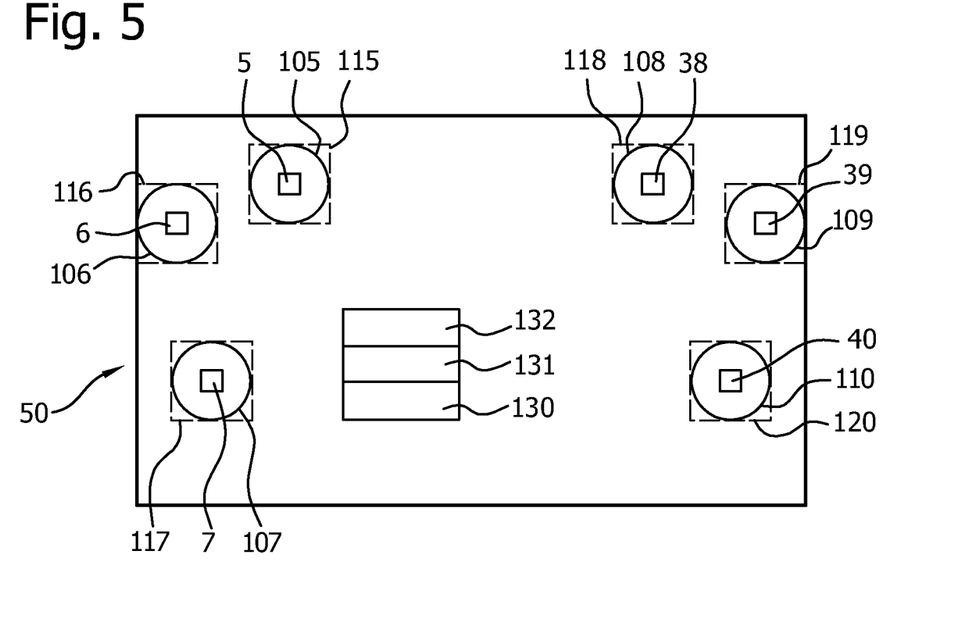
FIG. 5 shows a diagrammatic picture of a captured image.

FIG. 5 show a diagrammatic view of a captured image of the six controllable light sources 5,6,7,38,39,40 in the living room, wherein two controllable light sources 5, 38 are arranged on the ceiling, two controllable light sources 6, 39 attached to the wall and two controllable light sources 7,40 attached on respective floor bases.

An embodiment of a method for controlling a system comprising the controllable light sources 5,6,7,38,39,40 may comprise capturing the image 50 of the controllable light source 5,6,7,38,39,40 in the living room, displaying the captured image 50 on the display device 22 and associate the local areas 105,106,107,108,109,110 in the captured image with the respective one or more controllable light sources 5,6,7,38,39,40 on basis of information generated by the controllable light sources in the captured image 50. The information generated by the light source can be a shape, a color, or a brightness. Another example of information that can be generated comprises coding of the controllable light sources 5, 6, 7, 38, 39, 40 with for example, QR-code, Bar-code and other visible codes etc.

In case it is not possible to capture the controllable light sources in single shot, multiple images can be captured and one single image can be composed showing all the controllable light sources.

FIG. 5 also shows the local areas 105,106,107,108,109, 110 in the captured image associated with the controllable light sources 5, 6, 7, 38, 39, 40.

The method further comprises generating the user input comprising data corresponding to the indicated areas of the input device associated with the selected one of the local areas and communicate the first command to the controllable light source 5 via the communication device 25. The input device can be, for example, the touch screen 24 which can be integrated with the display device 22. The method further comprises associating areas of the touch screen 24 with the local areas in the displayed image. The displayed image can be a dynamic real time image.

FIG. 5 also shows the areas 115,116,117,118,119,120 of the touch screen 24 associated with the local areas 105,106, 107,108,109,110 of the captured image. A user can give a first command to control a selected one of the controllable light source 5, 6, 7, 38, 39, 40 by selecting and touching one of the associated areas on the touch screen 24 associated with the controllable light source he or she wishes to control. The user input from the touch input device indicates a selected one of the local areas 105,106,107,108,109,110 in the displayed image 50. The first command may comprise, for example, switching on the controllable light source 5 to emit light with a predefined color, intensity; and spatial distribution. A further embodiment of the method may comprise receiving an identification code of the respective controllable light sources 5, 6, 7, 38, 39, 40 from the system controller 3, storing the received identification codes in the memory device 23, and generating the first command from the user input from the touch input device 24 indicating one of the local areas 105,106,107,108,109,110 in the displayed image and the stored identification code. A further embodiment of the method may comprise displaying on the display device 22 a number of possible commands 130,131,132 related to the selected controllable light source 7. The possible commands may relate to on/off, intensity and/or color adjustments of the selected controllable light source. The user can give a further input on the touch screen 24 indicating a selected command. The method may further comprise receiving the further input and determining the selected command from the further input and communicating the command with the selected controllable light source 5. The possible commands can also relate to the controllable device comprising the controllable light source.

In a further embodiment the method may comprise assigning the controllable light sources 5, 6, 7, 38, 39, 40 to one or more groups using the identification codes, determining a group command from the user input for the one or more groups of the controllable light source and communicating the group command to the system controller. In this way the controllable light sources 5,6,7,38,39,40 can be divided in different groups, for example, a group of ceiling lamps 5,108 and a group of wall lamps 6,109 and a group of floor lamps 7,110. A few commands can then be sufficient to control the selected group of controllable light sources.

In order to improve the associating of the local areas 105,106,107,108,109,110 in the captured image to the respective controllable light sources 5,6,7,38,39,40 a further embodiment of the method can comprise sending commands to the system controller 3 to generate the respective information using the respective controllable light sources. The information carried by the emitted light of the controllable light source can be generated by switching the controllable light sources in parallel or subsequently one by one, to a predefined setting of a spatial distribution, color, and/or a brightness. The information may comprise a modulation or change of the spatial distribution, the color or the brightness of the respective controllable light sources. The generated information can be uniquely linked to the respective controllable light sources and the associated controllable devices.

For example, as a result of the commands sent to the system controller 3, each of the controllable light sources 5,6,7,38, 39,40 can emit light with a different color, intensity or spatial distribution generating the information related to that controllable light source or the controllable device, so that a user can identify each of the controllable light sources easily on the basis of the information carried in the emitted light.

In an embodiment, the result of the commands sent to the system controller 3 can be that each of the controllable light sources 5, 6, 7, 38, 39, 30 can be flashing with a different period. In this way, a user can associate the respective controllable light sources 5, 6, 7, 38, 39, 40 with the local areas 105,106,107,108,109,110 on the displayed captured image. In another embodiment the result of the commands sent to the system controller 3 can be that each of the controllable light sources 5,6,7,38,39,40 has a different color, for example, red, green, blue, cyan, magenta or yellow. In this way a user can easily associate the respective controllable light sources 5, 6, 7, 38, 39, 40 with the local areas 105,106,107,108,109,110 on the displayed captured image. The apparatus 20 may also be arranged to automatically associate the local areas 105,106,107,108,109,110 in the captured image with the controllable light sources 5, 6, 7, 38, 39, 40 using information generated by the controllable light sources. Thereto, the processor 26 may be arranged to segment the captured image 30 into the local areas 105,106, 107,108,109,110 and a background, for example by executing a threshold operation on the captured image. The threshold operation may comprise assigning a predefined maximum brightness to a respective picture element of the captured image if the brightness of the picture element is above a predetermined threshold value and to a predefined minimal value if the brightness of the picture element is below the threshold. The local areas 105,106,107,108,109, 110 can now be determined by clustering the picture elements with the maximum brightness.

Changes in the information generated by the controllable light sources at two subsequent instances in time can also be used to associate the local areas to the controllable light sources.

Figure 6A:
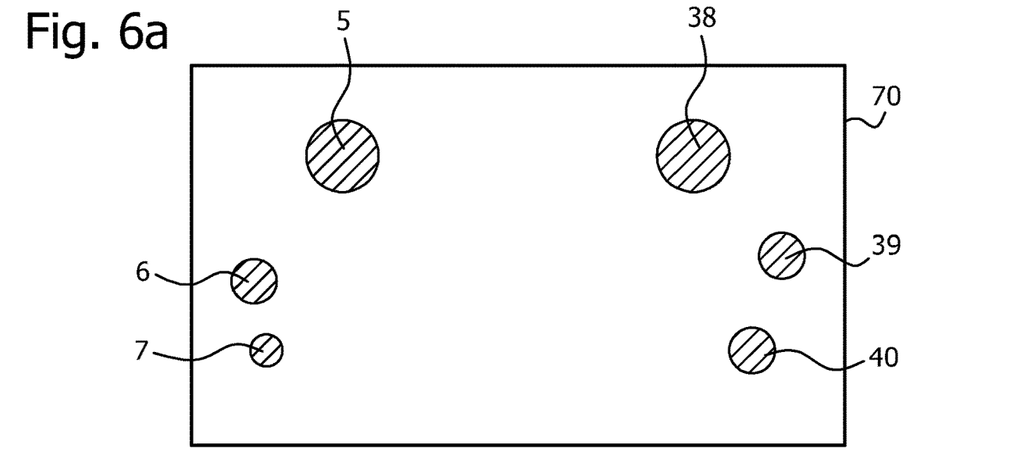
FIG. 6 shows a combination of two captured images.
Figure 6B:
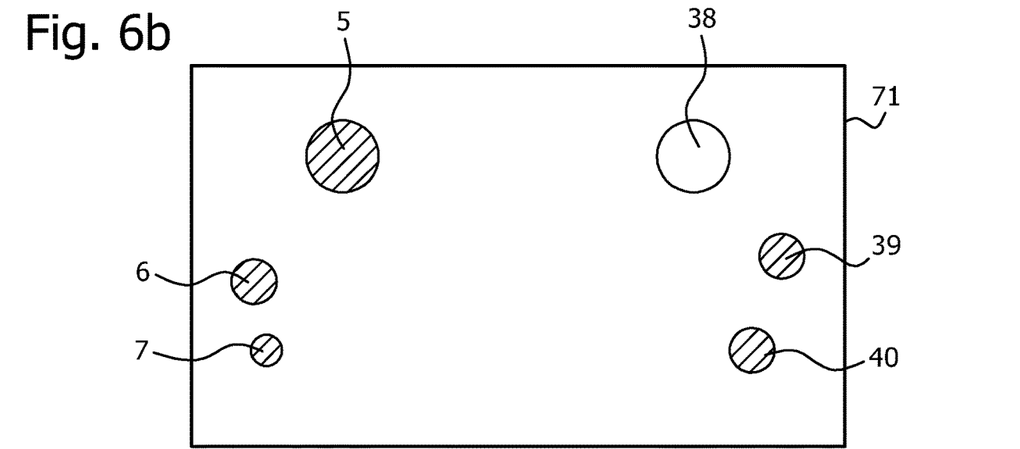
Figure 6C:
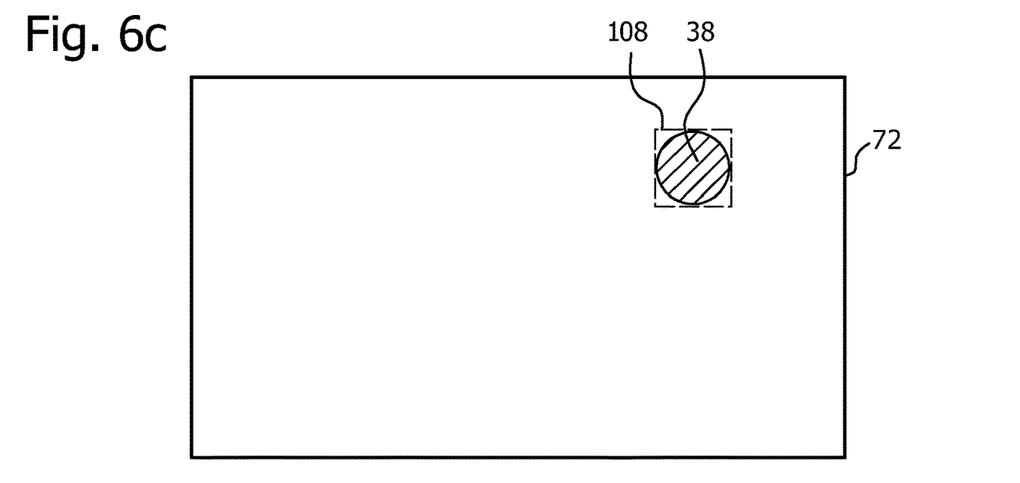

FIG. 6 shows a combination of two captured images captured at two subsequent instances in time. Thereto the method may comprise: sending commands to set all of the controllable light sources 5,6,7,38,39,40 to emit light with a first brightness, a first color and first spatial distribution; capturing a first image 70 of the controllable light sources; sending a command to a selected one of the controllable light sources with a second brightness, for example, by switching off the controllable light source 38; capturing a second image 71; and subtracting the second image 71 from the first image 70. The local area 108 can now be associated with this controllable light source 38 from this subtraction as shown in the result image 72. These steps can be repeated for all respective controllable light sources 5, 6, 7, 38, 39, 40 to associate the respective local areas with the controllable light sources.

Figure 7:
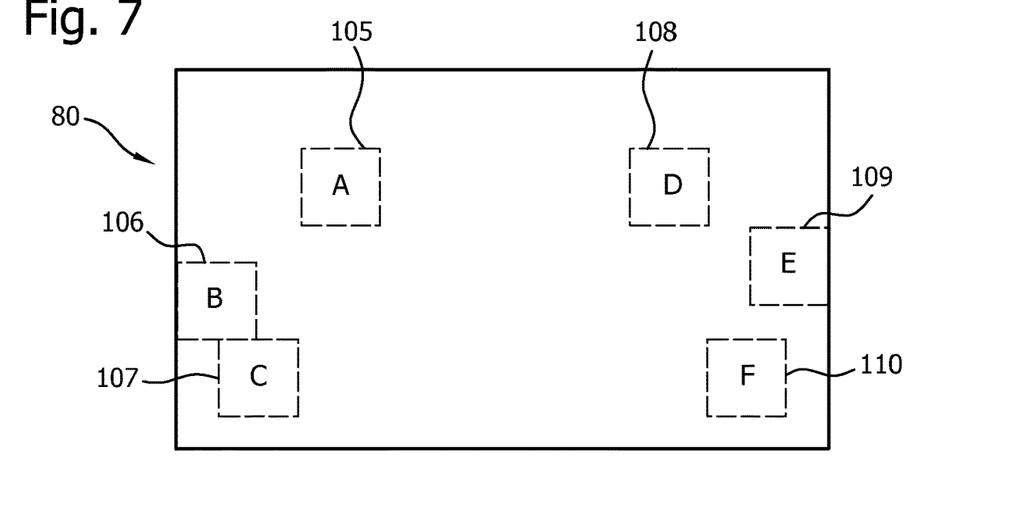
FIG. 7 shows a user interface map.

A further embodiment of the method may comprise assigning graphical symbols, for example character A, B, C, D, E and F, to the respective local areas 105,106,107,108,109,110 corresponding to the respective controllable light sources 5,6,7,38,39,40 in a user interface map 80.

FIG. 7 shows an example of the user interface map 80. The user interface map 80 can be displayed on the display device 22. The user interface map can be mixed with a dynamic image of the room wherein the controllable light sources 5, 6, 7, 38, 39, 40 are located. In this way associating the local areas and the controllable light sources can be simplified. Some or all steps of the described embodiments of the above described method can be implemented in a user application program (App). This user application can be loaded in the apparatus. The apparatus when executing the loaded dedicated application program can perform some or all of these steps automatically.

Figure 8:
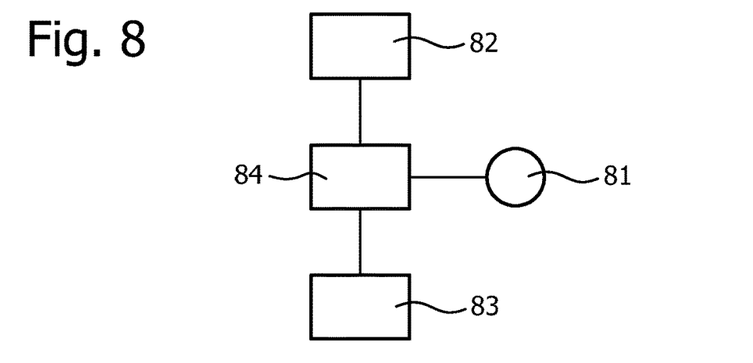
FIG. 8 shows a block diagram of an IP-TV-set.

FIG. 8 shows a further example of a controllable device which can be used in the system. The controllable device can comprise a Internet Protocol (IP) TV-set 80 provided with a single controllable light source comprising for example a LED 81, and a screen 82. The IP-TV-set is further provided with an IP interface 83 for connecting with the internet. The TV-set further comprises a controller 84 which is connected to the LED 81, the screen 82 and the IP interface 83.

Figure 9:
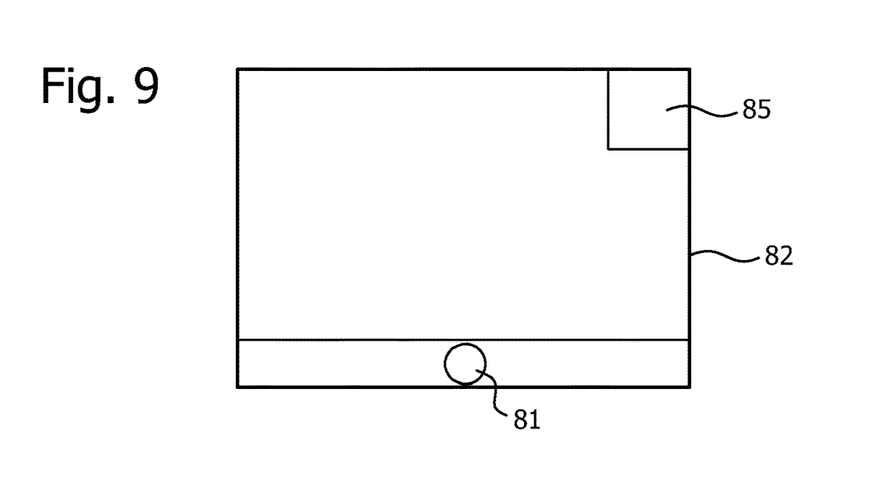
FIG. 9 shows a diagrammatic front view of an IP-TV-set.

FIG. 9 shows a diagrammatic front view of the IP-TV set. The controller 84 can be arranged to modulate the LED 81 with the IP-address and possible further information for example type information of the IP-TV-set. The modulation may comprise, for example Amplitude Shift Keying (ASK), Phase Shift Keying (PSK), Frequency Shift Keying (FSK), Quadrature Phase Shift Keying (QPSK), Offset-Quadrature Phase Shift keying (O-QPSK), etc.

The apparatus 20 can now be used to capture subsequent images of the IP-TV-set and the modulated light from the LED 81. Subsequently, the apparatus can decode the IP address and the further information from the received modulated light. The apparatus can be used as a control device for the IP-TV-set, when connected to the Internet.

Alternatively, the controller 84 can modulate an identifying watermark, for example, a number or character combination in the TV contents and display the modulated TV-contents on the screen 82. For example a number in the right upper corner 85 of the screen 82. The apparatus 20 can now be used to capture subsequent images of the IP-TV-set. In a further step, the apparatus 20 can now recognize the identifying number or character in the screen 82. This recognized character can be used to identify the IP-TV-set to be controlled. It is also possible to apply the Channel Mark linked to the displayed channel on the corner of the TV-screen 81 to recognize the IP-TV-set, since different TV's will display different contents. The apparatus 20 can be programmed with image recognition software for detecting the TV screen in the captured image.

Other domestic appliances that can be provided with controllable light sources or RGB LEDs are for example rice cooker, DVD player, washer, dish washer, micro waver, baker and etc. The controllable light source can be also be a matrix display.

The result of the commands sent to the system controller can be that the matrix display in front of the device starts displaying a predetermined sequence. Examples of the determined sequence the matrix display can light up from one end to another, display different characters, and/or flash.

The device type of the device to be associated can be transferred to the apparatus via networks for instance Internet protocol networks comprising Wi-Fi and other protocols.

The result of the commands sent to the system controller can be start working of the device and perform the visual difference.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for controlling a system comprising one or more controllable devices, the method comprising:
    capturing, via a camera device, an image comprising the one or more controllable devices;
    displaying, via a display device, the image, wherein the image is a dynamic real time image;
    sending a first command to a system controller controlling the one or more controllable devices to generate respective information, wherein the respective information comprises a change in a brightness of the emitted light of the respective controllable light source;
    identifying the one or more controllable devices, via emitted light, using respective controllable light sources associated with each of the respective one or more controllable devices;
    associating local areas in the image to the one or more respective controllable devices based on the respective information within the light emitted by the respective controllable light sources associated with each of the respective controllable devices in the image; wherein the associated local areas in the image to the one or more respective controllable devices further includes:
        turning off a first controllable device;
        capturing a further image of the first controllable device and a second controllable device of the one or more controllable devices; and
        determining a local area of the first controllable device from a combination of the image and the further captured image;
    receiving, via a user input device, a user input indicating a selected one of the local areas in the image that is displayed;
    determining, via a processor, a second command for the one or more controllable devices from the user input associated with the selected local area; and
    communicating, via a communication device, the second command to the one or more controllable devices.

2. The method as claimed in claim 1, wherein the method further comprises:
    associating areas of the user input device with the local areas in the image; and generating the user input comprising data corresponding to the indicated area of the user input device associated with the selected one of the local areas.

3. The method as claimed in claim 2, wherein the user input device is a touch screen device overlaying the displayed dynamic real time image.

4. The method as claimed in claim 1, wherein the method further comprises receiving identification codes associated with the one or more controllable devices.

5. The method as claimed in claim 4, wherein the method further comprising:
    assigning the one or more controllable devices to one or more groups using the identification codes;
    determining a group command from the user input for the one or more groups of the controllable devices; and
    communicating the group command to the system.

6. The method as claimed in claim 1, wherein the method further comprises:
    displaying a number of possible commands related to the selected controllable device;
    receiving a further input indicating one of the possible commands;
    determining the first command from the further input indicating one of the possible commands.

7. The method according to claim 1, wherein the respective information comprises a change in a color of the emitted light of the respective controllable light source.

8. The method according to claim 7, wherein the information comprises a modulation of the spatial distribution, the color, or the brightness.

9. The method as claimed in claim 1, wherein the method further comprises:
    changing the information associated with at least of the one or more controllable devices using the respective controllable light sources,
    capturing a further image of the one or more controllable light sources; and
    determining the local areas from a combination of the image and the further captured image.

10. The method as claimed in claim 1, wherein the method further comprises:
assigning graphical symbols to the respective local areas corresponding to the respective one or more controllable devices in a user interface map; and
displaying the user interface map.

11. An apparatus for controlling a system provided with one or more controllable devices, comprising:
a camera device configured to capture an image of the one or more controllable devices;
a display device configured to show the image; a user input device configured to receive a user input;
a communication device configured to communicate with the system; and a processor configured to control the camera, the display device, the user input device and the communication device, the apparatus further configured to:
capture, with said camera device, and display, with said display device, the image of the one or more controllable devices, wherein the image is a dynamic real time image;
send, with said communication device, a first command to a system controller controlling the one or more controllable devices to generate respective information, the respective information comprising a change in a spatial distribution of a light beam of the emitted light of the respective controllable light source;
associate, with said processor, local areas of the image with the one or more controllable devices based on the respective information generated by light emitted by a respective controllable light source associated with each of the respective one or more controllable devices in the image; wherein the associated local areas in the image to the one or more respective controllable devices further includes:
turning off a first controllable device;
capturing a further image of the first controllable device and a second controllable device of the one or more controllable devices; and
determining a local area of the first controllable device from a combination of the image and the further captured image;
receive, with said user input device, the user input indicating a selected one of the local areas in the image that is displayed;
determine, with said processor, a second command for the one or more controllable devices from the user input associated with the selected local area; and
communicate, with said communication device, the second command to the one or more controllable devices.

12. The apparatus for controlling a system as claimed in claim 11, wherein the apparatus is further provided with a memory device configured to store identification codes, and the processor is configured to control the memory device as well.

13. A computer program product, which is stored on a non-transitory computer readable storage media, and which is suitable to perform the method according to claim 1, when it is run on a digital computer or a digital mobile device.

* * * * *